(12) United States Patent
Ragonesse

(10) Patent No.: US 12,070,045 B2
(45) Date of Patent: Aug. 27, 2024

(54) METHOD OF MAKING COATED PITA CHIP

(71) Applicant: Regina Ragonesse, Haverhill, MA (US)

(72) Inventor: Regina Ragonesse, Haverhill, MA (US)

( * ) Notice: Subject to any disclaimer, the term of this patent is extended or adjusted under 35 U.S.C. 154(b) by 351 days.

(21) Appl. No.: 16/104,415

(22) Filed: Aug. 17, 2018

(65) Prior Publication Data

US 2018/0352828 A1 Dec. 13, 2018

Related U.S. Application Data

(63) Continuation-in-part of application No. 15/353,075, filed on Nov. 16, 2016, now abandoned.

(51) Int. Cl.
| | | |
|---|---|---|
| *A23G 1/54* | (2006.01) | |
| *A23L 7/122* | (2016.01) | |
| *A23P 20/13* | (2016.01) | |
| *A23P 20/17* | (2016.01) | |
| *A23P 20/18* | (2016.01) | |

(52) U.S. Cl.
CPC .............. *A23G 1/54* (2013.01); *A23L 7/122* (2016.08); *A23P 20/13* (2016.08); *A23P 20/17* (2016.08); *A23P 20/18* (2016.08); *A23V 2002/00* (2013.01); *A23V 2200/22* (2013.01); *A23V 2250/154* (2013.01); *A23V 2250/60* (2013.01)

(58) Field of Classification Search
None
See application file for complete search history.

(56) References Cited

FOREIGN PATENT DOCUMENTS

GB 2452837 * 3/2009

OTHER PUBLICATIONS

Baked Pita Chips, Jun. 23, 2011.*
Brown Sugar and Honey Pita Chips with almonds, Aug. 21, 2014.*
Buttermilk Glaze, Oct. 1997.*
Alea Milham, "How to Make Caramel Popcorn", Dec. 5, 2012.*
Brown Sugar Butter Syrup, Jan. 28, 2014.*
Valentine's Pita Crunch, Feb. 2013.*

* cited by examiner

*Primary Examiner* — Lien T Tran
(74) *Attorney, Agent, or Firm* — Lambert Shortell & Connaughton; David J. Connaughton, Jr.; Justin P. Tinger

(57) ABSTRACT

A coated pita chip and method of producing it are presented herein. A pita chip may be coated with a sugar-based syrup or chocolate. If the pita chip is coated with a sugar-based syrup, the coated chip may be baked or cooled to harden and bond the coating to the chip. If the pita chip is coated with a chocolate coating, the pita chip is cooled to harden and bond the chocolate to the chip. Additional food items, inclusions, such as nuts, dried fruit pieces, granola, seeds, spices and the like may be adhered to the chip by the hardened coating.

11 Claims, 4 Drawing Sheets

METHOD OF MAKING COATED PITA CHIP

CROSS REFERENCE TO RELATED APPLICATIONS

This Continuation-In-Part patent application claims priority from U.S. patent application Ser. No. 15/353,075 filed on Nov. 16, 2016.

FIELD OF THE INVENTION

The present invention relates generally to chip items. More particularly the present invention relates to coated pita chips.

BACKGROUND OF THE INVENTION

Pita chips and other similar food items are common snacks. In some cases, such chips may even be seasoned with a granular or powdered food item such as salt, seasoning blends, herbs, spices, and the like. These foods are sufficient in many cases but often suffer from a boring repetitiveness. Currently, no food items are presented that coat the chips with a coating of flavoring on the chips.

Therefore, what is needed is a pita chip food item that provides a coating mix over the crispy pita chip. The coating mix may be a sugar-based syrup or a chocolate coating. The present invention provides a pleasant and desirable contrast in flavors between the savory pita chip and a sweet coating.

SUMMARY OF THE INVENTION

The subject matter of this application may involve, in some cases, interrelated products, alternative solutions to a particular problem, and/or a plurality of different uses of a single system or article.

In one aspect, a method of producing a food item is provided. The method includes the steps of coating a pita chip with a liquefied coating mix and cooling the liquefied coated pita chip, where the coating mix is hardened and bonded to the pita chip. The method may include the further step of coating the coated pita chip with inclusions before cooling the coated pita chip. The coating mix is either a sugar-based syrup or chocolate. The chocolate can be white, milk, cocoa or dark chocolate.

Another embodiment of the invention is a coated pita chip. The coated pita chip comprises a coating mix hardened and bonded to the exterior of the pita chip, and inclusions immersed into the coating mix. The coating mix is either a sugar-based syrup or chocolate. The inclusions are selected from a group consisting of walnuts, pecans, cashews, pistachio, hazelnuts, brazil nuts, almonds, macadamia nuts, peanuts, dried fruit pieces of cranberries, cherries, coconut flakes, banana, dates, and apricots, chia seeds, hemp seeds, flax, quinoa, sunflower seeds, pumpkin seeds, granola, trail mix, grains, chocolate, candy, protein powder, ginger, sea salt, cinnamon, pumpkin spice, apple spice, cardamom, allspice, and cayenne pepper.

In a further embodiment, the sugar-based syrup may consist of sugar, syrup, butter, baking soda, extract, water, and spices. The syrup may be selected from a group consisting of corn-syrup, brown rice syrup, tapioca syrup, ginger syrup, maple syrup, peppermint syrup, coffee syrup, molasses, and honey. The extract is selected from a group consisting of vanilla extract, coconut extract, orange extract, cherry extract, apple extract, and lemon extract. The baking soda may be replaced with corn starch, and the spices may be selected from a group consisting of ginger, sea salt, cinnamon, pumpkin spice, apple spice, cardamom, allspice, and cayenne pepper.

The coating mix may be applied to the pita chips by tumbling, enrobing via an enrobing machine, submerging the pita chip into the coating mix, spraying, brushing or drizzling the coating mix onto the pita chips.

DETAILED DESCRIPTION

The present subject matter will now be described more fully hereinafter with reference to the accompanying figures, in which representative embodiments are shown. The present subject matter can, however, be embodied in different forms and should not be construed as limited to the embodiments set forth herein. Rather, these embodiments are provided to describe and enable one of skill in the art. Unless otherwise defined, all technical and scientific terms used herein have the same meaning as commonly understood by one of ordinary skill in the art to which the subject matter pertains. All publications, patent applications, patents, and other references mentioned herein are incorporated by reference in their entirety.

Generally, the present invention concerns a coated pita chip. The coated pita chip may have either a sugar-based syrup coating or a chocolate coating.

Figure 1:
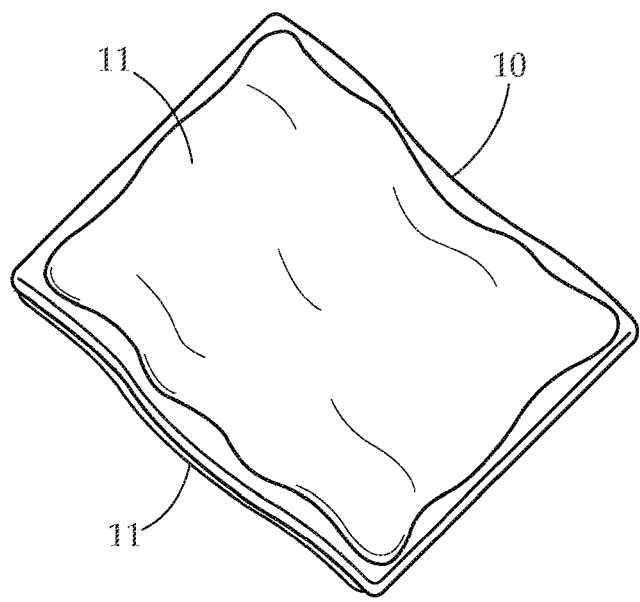
FIG. 1 provides a view of an embodiment of a syrup coated pita chip having the syrup hardened on an exterior of the chip.

In one embodiment (FIG. 1), a coating mix 11 may be bonded onto the pita chip 10 to form a hardened coating fully or at least partially covering the pita chip. The coating mix 11 may either be a sugar-based syrup or a chocolate coating. If the coating mix is a sugar-based syrup, the coating mix may be hardened and bonded to the pita chip either through a baking process or a cooling process. If the coating mix 11 is a chocolate coating, the chocolate coating is hardened and bonded to the pita chip through a cooling process. The coating contemplated herein differs from a granular sugar grain coating or dusting in many ways, namely, the coating is formed from a liquid syrup or liquefied chocolate and results in a hardened coating that is bonded to the pita chip, as opposed to a granular material such as sugar coating or dusting which may easily fall off of the pita chip. In some cases, a portion of the coating is bonded with the chip, forming a chip layer, a combination chip and coating layer, and a hardened coating layer.

In another embodiment, the coating mix 11 is applied to the pita chips 10 through an enrobing machine (not shown) such that either a syrup mixture or liquefied chocolate is deposited onto the pita chips as the chips travel via a conveyor system. The coated pita chips may then be cooled in a cooling tunnel which is part of the enrobing machine, such that the coating is hardened and bonded to the pita chip.

The pita chip contemplated herein may be any sort of crispy rigid chip formed from a pita bread. Such chips may be formed in any cooking manner from a cooked pita bread. Examples of cooking methods to create the chips may include, but are not limited to: frying, deep frying, kettle cooking, baking, and the like. In other alternative embodiments, other chips and snacks (such as potato, vegetable, tortilla, corn, flour, pretzels and the like) may be used as the base chip to be coated. In such embodiments, these chips may be replaced with the pita chip and treated as discussed throughout the specification.

The term "syrup" or sugar-based syrup is used to refer to a liquid and/or suspension that contains sugar, including but not limited to saturated and super saturated liquid and is used herein to refer to a liquid phase of a coating material. The term "glaze" is used herein to refer to the syrup once applied to the pita chips and hardened to a brittle and crisp coating.

The sugar-based syrup may include butter, sugar, corn syrup, baking soda, vanilla extract, water, and salt. The sugar-based syrup recipe may be modified to preferably include brown sugar as the sugar ingredient. It is noted that the term sugar is used herein to refer to natural sweeteners including, but not limited to sucrose, glucose, fructose, and the like. The corn syrup may be replaced or combined with either rice syrup, preferably brown rice syrup, tapioca syrup, ginger syrup, molasses and/honey and the like. Brown rice syrup has a lower sugar content than many similar syrups. The vanilla extract may be replaced with other flavored extracts including coconut, orange, cherry lemon, apple and the like. Preferably sea salt is used in the recipe as the salt component.

It is to be understood that further alternative ingredients may be used to create the syrup that is capable of being coated onto the pita chip in a liquid form and baked or cooled into a solid form. Corn, rice, and/or tapioca syrups, or other similar syrups in combination with corn starch or baking soda has been shown to yield optimal glaze consistency, to allow binding to the pita chip, and to securely bind granular food items (discussed below), holding them to the pita chip (in certain embodiments). While a sugar syrup is the most commonly contemplated embodiment discussed herein, it is also possible to achieve a similar syrup and glaze material using a protein based syrup solution that uses proteins instead of sugar as the thickening and hardening agent.

In varying embodiments, the syrup may further comprise additional flavoring or seasoning. For example, a fruit flavored syrup may be used, a maple flavored syrup, spiced syrup such as peppermint and coffee, and the like.

In the varying syrup recipes, the various ingredients are mixed together and heated, typically to approximately 280 degrees Fahrenheit, but not higher than 300 degrees Fahrenheit, to dissolve any soluble materials and evenly distribute any non-soluble materials in the liquefied sugar-based syrup. Initially, sugar, syrup and water are combined and brought to a temperature of approximately 280 degrees Fahrenheit. After these ingredients are combined and dissolved, the temperature is lowered so as to add the other ingredients. In particular, the butter should be added at a lower temperature so as not to burn the butter. The remaining ingredients are added and any soluble materials are dissolved and any non-soluble materials are evenly distributed in the liquid coating mix. The liquid coating mix's temperature is lowered to between 200 and 230 degrees Fahrenheit, and preferably to 215 degrees Fahrenheit, which is the temperature at which the coating mix is applied to the pita chips.

Alternative to a sugar-based syrup coating, the invention includes a chocolate-covered pita chip. It is contemplated that the chocolate coating may comprise white, milk, cocoa or dark chocolate. In addition, the chocolate coating may comprise flavored chocolate such as hazelnut, pistachio and the like. The chocolate coating is heated to a liquefied state before being applied to the pita chips.

The varying chocolate coatings are heated to a liquefied phase where additional flavoring ingredients may be added. In the liquefied phase, the flavoring ingredients may be evenly distributed throughout, through either manual or automated mixing.

Figure 2:
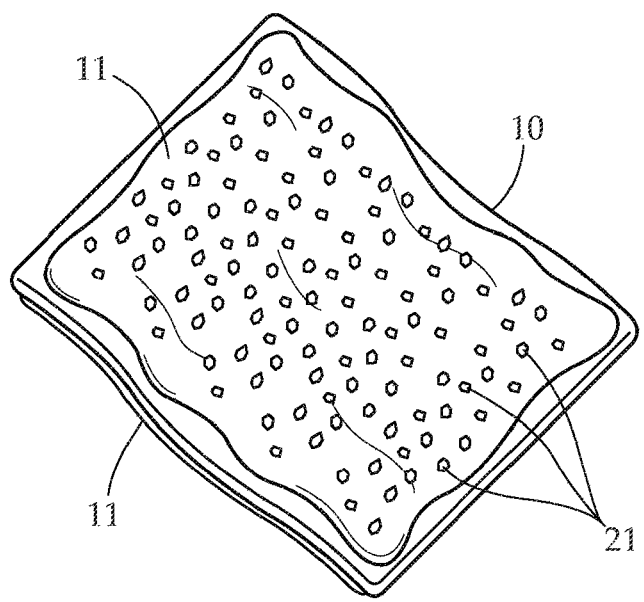
FIG. 2 provides a view of another embodiment of a syrup coated pita chip having the syrup hardened on an exterior of the chip and holding a granular edible material to the chip.

In addition to the coating mix 11, sugar-based syrup and chocolate, being applied to the pita chips 10, granular food items ("inclusions") may be added which adheres to and is held in place by the hardened sugar-base syrup or chocolate. (FIG. 2) Examples of inclusions 21 that may be adhered to the pita chip include, but are not limited to nuts (ex. walnuts, pistachio, hazelnuts, pecans, cashews, brazil nuts, almonds, macadamia nuts, and peanuts), dried fruit pieces (ex. cranberries, cherries, coconut flakes, banana, dates, apricots), seeds (ex. chia seeds, flax, hemp seed, quinoa, sunflower seeds, pumpkin seeds), granola, trail mix, grains, chocolate (ex. white, milk, dark), candy, protein powder, spices or spice blends (ginger, sea salt, cinnamon, pumpkin spice, apple spice, cardamon, allspice, cayenne pepper), and the like. It is anticipated that the granular food pieces, such as the nuts and dried fruit pieces will be chopped into pieces before being applied to the coated pita chips. However, it is contemplated that some of the granular food pieces may be whole nuts, fruit pieces, etc. It is envisioned that more than one type of inclusions may be included in the preparation of the coated pita chips. For example, it is envisioned, without limitation, that coated pita chips may comprise salted caramel pecan, coconut banana walnut, apple cranberry cashew and the like. Other flavors are expressly contemplated.

The quantity of each ingredient may vary according to taste and bonding characteristics. The three main ingredients, butter, sugar and corn syrup, comprise between 80 to 90% of the recipe and are approximately equally distributed in quantity. The amount of sugar may differ more than either the butter or corn syrup depending on taste. The salt may comprise between 1 and 3% of the recipe, and water ingredients comprise between 6 and 15% of the recipe. Vanilla extract may comprise between 1 and 3% of the recipe, and baking soda may comprise between 0.5 and 1.5% of the recipe. Preferably, the recipe consists of butter, 24%, sugar, 34%, syrup 28%, water 9%, salt 1.6%, extract 1.93% and baking soda 0.96%

In varying embodiments, coating mixes that have a higher bonding characteristic may include corn starch and corn/rice/tapioca or other plant-based syrup. Other plant-based syrups may include, but are not limited to: honey, molasses, date syrup, coconut based sugar syrups, and the like. However, it should be understood that the coating mix 11 may be formed of any number of ingredients, so long as it can bond the inclusions 21 to the pita chip 10.

In one embodiment the invention is produced by first baking a pita bread. The recipe for pita bread and the process of making pita bread is previously known. Once this bread is baked, it may be cut into pieces and then cooked in the presence of a fat and/or oil (such as kettle cooking, baking, frying, deep frying, and the like). After this stage, the resulting product is a pita chip. Alternatively, the pita chips may be purchased.

Once the pita chip is formed, a heated coating mix 11 may be applied and may coat the outer surface of the chip, either completely or partially. The heated coating mix 11 may be applied on the pita chip 10 in any manner. Non-limiting examples of the application of the coating mix may include: submerging the chip in a quantity of coating mix, spraying the coating mix onto the chip, tossing the chips in the coating mix, brushing the coating mix onto the chip, tumbling the pita chips in a container or tumble drum with the coating mix, drizzling the coating mix onto the chip, and the like.

A preferred method is to apply the coating mixture using an enrobing machine. Pita chips are deposited on a conveyor system that transfers the pita chips to a prebottoming device to coat the bottom of the chips. Next the pita chips travel under a flow pan to receive the coating to the top of the pita chips, then past an air nozzle (blower) to remove surplus coating, and finally through a cooling tunnel to harden and bond the coating mix to the pita chip before the coating pita chips arrive at a packaging area. It is contemplated that the pita chips may simultaneously travel through the prebottoming device and under a flow pan to coat the pita chips. If inclusions are to be included, after the flow pan, the chips are transferred under one or more hoppers, preferably two hoppers suspended above the conveyor system that sprinkles or deposits the inclusions onto the enrobed coating mix. One hopper may be used for large inclusions, such as nuts, dried fruit pieces and the like. A second hopper may be used for smaller or finer inclusions, such as spices and spice blends. The hoppers may move side to side to evenly sprinkle/deposit the inclusions onto the coated pita chips. Alternatively, the conveyor system with the pita chips may move side to side to ensure the inclusions are evenly deposited onto the chips. A further alternative embodiment is that the hopper(s) may have a sufficiently wide opening to cover the width of the conveyor system with the pita chips without necessitating moving either the chips or the hopper(s) side to side. Inclusions may also be positioned on the conveyor belt/system prior to the pita chips being placed on the conveyor belt, such that the pita chips are laying on top of the inclusions when the chips enter the prebottoming device having either the sugar-based syrup or the liquefied chocolate. Alternatively, after the pita chips have been coated/enrobed, they are transferred to a conveyor belt having inclusions placed on the conveyor belt such that as the pita chips move onto the conveyor belt, the inclusions adhere to the bottom of the coated/enrobed chips. The enrobed pita chips then travel through a cooling tunnel to harden and bond the coating mix and inclusions, if added, to the pita chips. After the cooling process, in some cases, the chips may group together and the hardened coating mix may bind the chips together. In such a case, an additional step of breaking up the bound chips may be performed to yield smaller coated chip pieces.

If the coating mix is liquefied chocolate, the enrobing machine maintains the chocolate at the constant temperature of between 100 and 110 degrees Fahrenheit and preferably 105 degrees Fahrenheit prior to enrobing the pita chips. If the coating mix is a sugar-based syrup, the enrobing machine maintains the chocolate at the constant temperature of between 200 and 230 degrees Fahrenheit and preferably 215 degrees Fahrenheit prior to enrobing the pita chips. If the pita chips are coated using another method, other than an enrobing machine, the coating mix is still heated prior to application to the pita chips. In such an embodiment, the temperature of the coating mix is the same as if the pita chips are enrobed using an enrobing machine.

If the coating mix is a sugar-based syrup, the coated chip may be baked or cooled to harden the coating. If, however, the coating mix is a liquefied chocolate, the coated chip is cooled to harden and adhere the chocolate to the chip.

Figure 3:
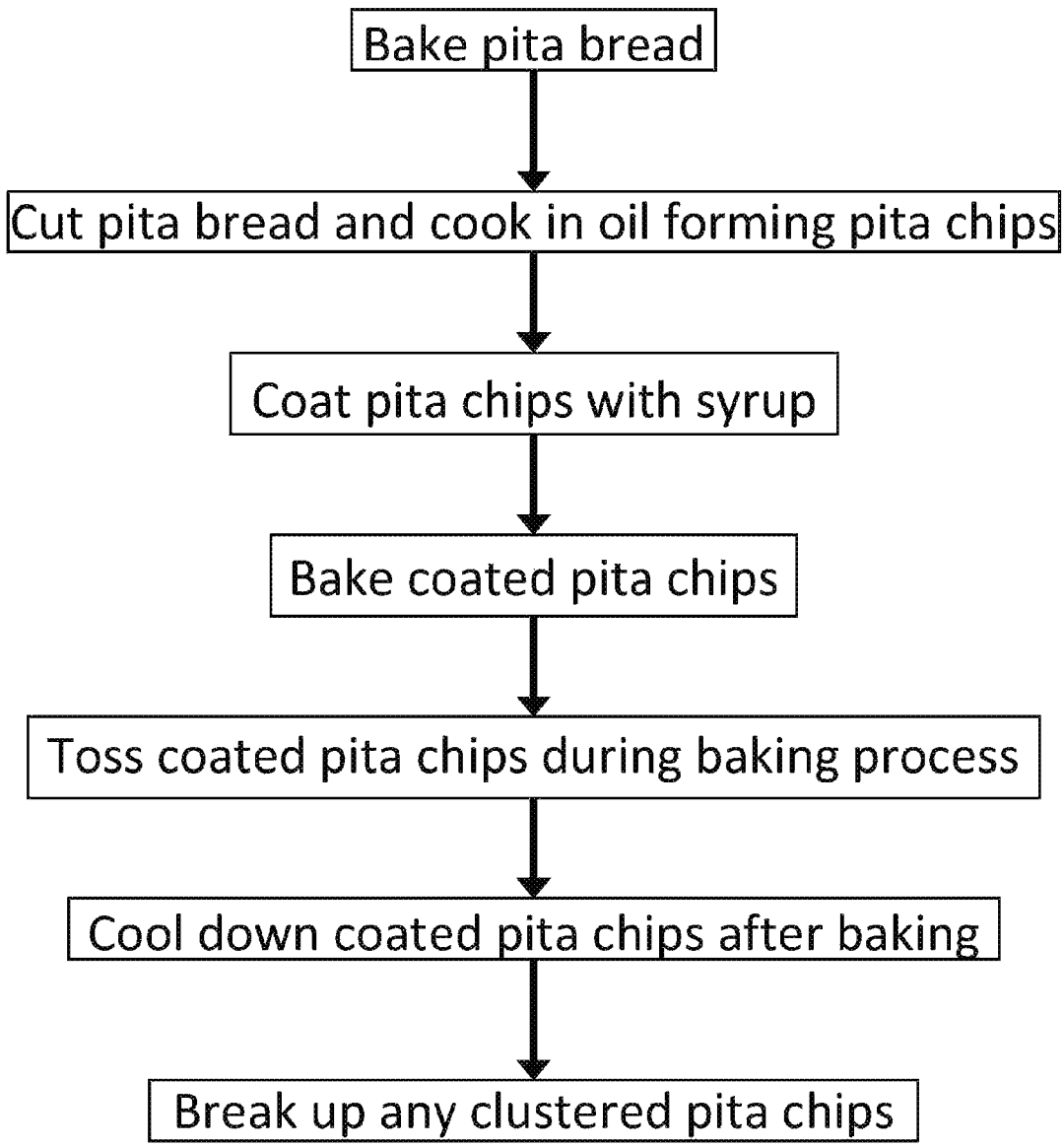
FIG. 3 provides a flow chart of one embodiment of preparation of the present invention.

FIG. 3 depicts a flow chart of one embodiment of the present invention. In this embodiment, the process begins with baking pita bread from dough to create the bread (which is known to be soft and flexible). Once the bread is baked, it is cut into pieces and cooked in oil. This cooking may include, but is not limited to: frying, deep frying, kettle cooking, baking, and the like. Once the cooking process is finished, the pita bread pieces are now pita chips. The chips may be seasoned, or not. This seasoning may occur after the chips are coated with a coating mix. Next, the pita chips is coated with a sugar-based syrup. As noted previously, the pita chips may be coated by submerging the chip in a quantity of syrup, spraying the syrup onto the chip, tossing the chips in the syrup, tumbling the pita chips in a container or tumbling drum with the coating mix, brushing the syrup onto the chip, drizzling the syrup onto the chip, and the like. A preferred method is to apply the coating mixture using an enrobing machine. Optionally, inclusions 21 may be added to coated pita chip. In one preferred embodiment, the inclusions are dispensed from a series of hoppers located above the pita chips. Alternatively, the inclusions may be included in the coating mix as the mix is applied to the chip in the container or tumbling drum. In another alternative embodiment, after the coating mix is applied to the pita chips, inclusions may be sprinkled or dispensed onto the pita chips as the pita chips are shaken/agitated in a container or tumbling drum allowing the inclusions to adhere to the moist coating mix. The coated pita chips may then be baked at a moderately low temperature between 150 and 300 degrees Fahrenheit, and more preferably at 250 degrees Fahrenheit for between 30 minutes and 2 hours, and more preferably one hour. The temperature and time may vary based on a number of factors, including but not limited to, altitude, particular syrup recipe used, operating characteristics of the oven (ex. conventional versus convection), and others. During the baking step, water in the syrup evaporates, but does not excessively burn the syrup or disrupt the consistency of the pita chip. During the baking process, the coated pita chips may be periodically tossed or otherwise agitated to facilitate even cooking and crispness of the glaze formed by the syrup. In a particular embodiment, the tossing may be performed every twenty minutes of the baking process. Once the baking process has completed, the chips having a glaze may be cooled. In some cases, the chips may group together and the glaze may bind the chips together. In such a case, an additional step of breaking up the bound chips may be performed to yield smaller chip and glaze pieces.

Figure 4:
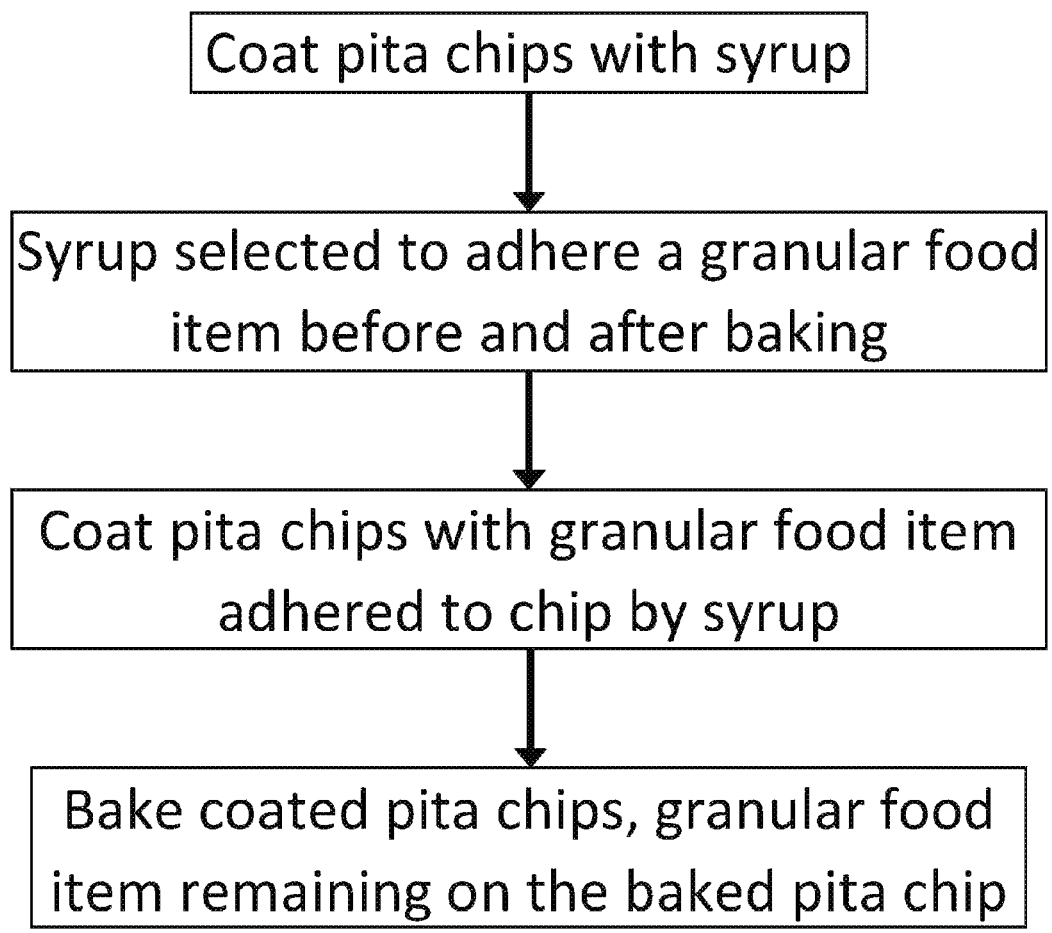
FIG. 4 provides a flow chart of another embodiment of preparation of the present invention.

FIG. 4 depicts a flow chart of another embodiment of the present invention. In this embodiment, pita chips 10 are initially coated with a sugar-based syrup 11. The syrup-coated pita chips may next be coated, dredged, or otherwise exposed to inclusions 21. The syrup, as noted, is selected to adhere the inclusions to the pita chip. The combination food item (pita chip, syrup, inclusions) is then baked for a time period sufficient to solidify the syrup into glaze that retains the granular food item on the pita chip as described in the above embodiment. Once the baking process has completed, the chips having the glaze may be cooled. In some cases, the chips may group together and the glaze may bind the chips together. In such a case, an additional step of breaking up the bound chips may be performed to yield smaller chip and glaze pieces.

Figure 5:
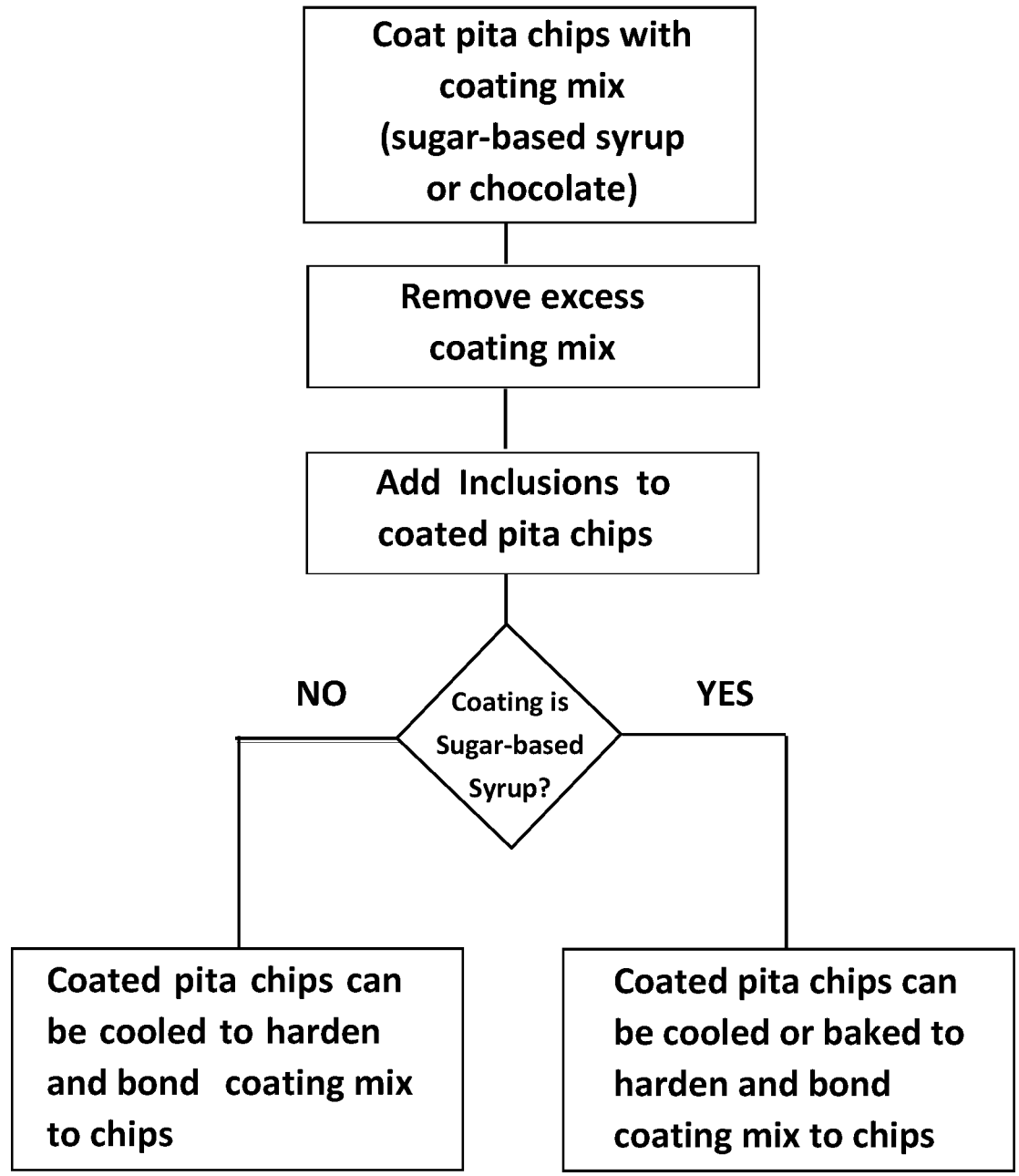
FIG. 5 provides a flow chart of a further embodiment of preparation of the present invention.

FIG. 5 depicts a flow chart of yet another embodiment of the present invention. This embodiment may utilize an enrobing machine for coating, adding inclusions 21 and cooling the coated pita chips 10. Enrobing machines are known in the industry and will not be described in detail. In this embodiment, pita chips 10 are placed on a conveyor system that transports the pita chips through an enrobing phase where the pita chips are engulfed with a coating mix, either sugar-based syrup or liquefied chocolate from above and below. If the pita chip is coated with a sugar-based syrup, the sugar-based syrup is heated to a constant temperature of between 200 and 230 degrees Fahrenheit, and preferably to a temperature of 215 degrees Fahrenheit. If the pita chip is coated with a liquefied chocolate, the chocolate is heated to a constant temperature of between 100 and 110 degrees Fahrenheit, and preferably to a temperature of 105 degrees Fahrenheit. Excess coating mix is preferably removed through a blower phase before the coated pita chips may be routed to a conveyor belt under one or more hoppers containing inclusions which are dispensed onto the chips. The coated pita chips may be agitated side to side or the series of hoppers containing the inclusions are moved side to side to allow an even distribution of the inclusions onto the coated pita chips or the opening of each hopper of the series of hoppers may be sufficient wide to evenly deposit the inclusions onto the coated pita chips without requiring either the chips or hopper(s) be moved side to side. In a preferred method, two (2) hoppers are employed. The first hopper contains large granular food items such as nuts, dried fruit pieces, granola and the like. The second hopper deposits the finer or smaller inclusions such as the spices and spice blends. Inclusions may also be positioned on the conveyor belt/system prior to the pita chips being placed on the conveyor belt, such that the pita chips are laying on top of the inclusions when the chips enter the prebottoming device having either the sugar-based syrup or the liquefied chocolate. Alternatively, after the pita chips have been coated/enrobed with the sugar-based syrup or liquefied chocolate, pita chips are transferred to a conveyor belt having inclusions placed on the conveyor belt such that as the pita chips move onto the conveyor belt, the inclusions adhere to the bottom of the coated/enrobed chips. In some applications of this embodiment, the deposition of inclusions onto the pita chips may be excluded. The coated pita chips are then routed to a cooling tunnel to harden and bond the coating mix and inclusions, if added, to the pita chip. The temperature of the cooling tunnel is between 35 and 50 degrees Fahrenheit and preferably 40 degrees Fahrenheit. In some cases, the chips may group together and the hardened coating mix may bind the chips together. In such a case, an additional step of breaking up the bound chips may be performed to yield smaller chip and glaze pieces.

The present invention may be produced using equipment on various scales. For example, on a small scale production, traditional kitchen items and equipment may be used. On a manufacturing scale production, specialized equipment, such as enrobing machines, may be utilized to optimize the process. It should be understood that any equipment may be used in varying embodiments without straying from the scope of the present invention.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

The invention claimed is:

1. A method of making a hard-coated pita chip having a chip layer, a combination pita chip and hardened syrup layer, and a hardened syrup layer, the method comprising the steps of:
    preparing a liquefied sugar-based syrup comprising the steps of
    combining sugar, syrup and water;
    heating the combination sugar, syrup and water to between 280 and 300 degrees Fahrenheit until soluble materials are dissolved and evenly distributed into a liquefied mixture;
    lowering the temperature of the liquefied mixture and adding butter, baking soda, salt, and extract to the heated liquefied mixture, wherein the butter, baking soda, salt and extract are dissolved and evenly mixed into a liquefied mixture forming a liquefied sugar-based syrup;
    the butter, sugar, and syrup comprising between 80-90% of the liquefied sugar-based syrup, the salt comprising between 1%-3% of the liquefied sugar-based syrup, water comprising between 6-15% of the liquefied sugar-based syrup, extract comprising between 1%-3% of the liquefied sugar-based syrup, and baking soda comprising between 0.5%-1.5% of the liquefied sugar-based syrup,
    lowering the temperature of the liquefied sugar-based syrup to between 200 and 230 degrees Fahrenheit; and
    coating pita chips with the liquefied sugar-based syrup, forming a combination pita chip and liquified syrup layer,
    coating the coated pita chips with one or more inclusions;
    the liquified sugar-based syrup composition selected to allow binding of the syrup to pita chip as well as inclusions to and in the hardened syrup layer;
    wherein the coated pita chips are baked at a temperature of 250-300 degrees Fahrenheit to harden and bond the liquefied sugar-based syrup to the pita chips;
    hardening the liquefied sugar-based syrup such that the sugar-based syrup is bonded with the one or more inclusions to the pita chips and such that the sugar-based syrup is bonded with the pita chip, forming the combination pita chip and hardened syrup layer comprised of both pita chip and hardened sugar-based syrup, and such that the sugar-based syrup forms the hardened syrup layer on top of the combination pita chip and hardened syrup layer, and
    wherein the sugar-based syrup is hardened to a brittle and crisp coating at the hardened syrup layer.

2. The method of claim 1, wherein the syrup is selected from a group consisting of corn-syrup, brown rice syrup, tapioca syrup, ginger syrup, maple syrup, peppermint syrup, coffee syrup, molasses, and honey.

3. The method of claim 1, wherein the inclusions are selected from a group consisting of walnuts, pistachio, hazelnuts, brazil nuts, almonds, macadamia nuts, peanuts, dried fruit pieces of cranberries, cherries, coconut flakes, dates, and apricots, chia seeds, sunflower seeds, pumpkin seeds, granola, trail mix, grains, chocolate, candy, protein powder, ginger, sea salt, cinnamon, pumpkin spice, apple spice, cardamom, allspice, and cayenne pepper.

4. The method of claim 1, wherein the liquefied sugar-based syrup is applied to the pita chip by one of tumbling, enrobing via an enrobing machine, submerging the pita chip into the coating mix, spraying, brushing or drizzling.

5. The method of claim 4, further comprising the step of breaking up a cluster of a plurality of coated pita chips joined together by the hardened coating, wherein the breaking up separates the pita chip cluster into single pita chip pieces.

6. The method of claim 1, wherein the extract is selected from a group consisting of vanilla extract, coconut extract, orange extract, apple extract, cherry extract, and lemon extract.

7. The method of claim 1, wherein the baking soda may be replaced with corn starch, and wherein the salt is sea salt.

8. The method of claim 1, wherein the liquefied sugar-based syrup consists of about 24% butter, 34% sugar, 28% syrup, 9% water, 2% salt, 2% extract and 1% baking soda.

9. The method of claim 1, wherein the coated pita chips are cooled at a temperature between 35 and 50 degrees Fahrenheit to harden and bond the liquefied sugar-based syrup to the pita chips.

10. The method of claim 1 wherein the inclusions are applied to the coated pita chips prior to hardening and bonding the liquefied sugar-based syrup to the pita chips.

11. The method of claim 1, wherein the inclusions are mixed with the liquefied sugar-based syrup prior to coating the coated pita chips.

* * * * *